March 24, 1953  O. K. FOSTER ET AL  2,632,610
CONTROL LINE REEL
Filed April 7, 1948
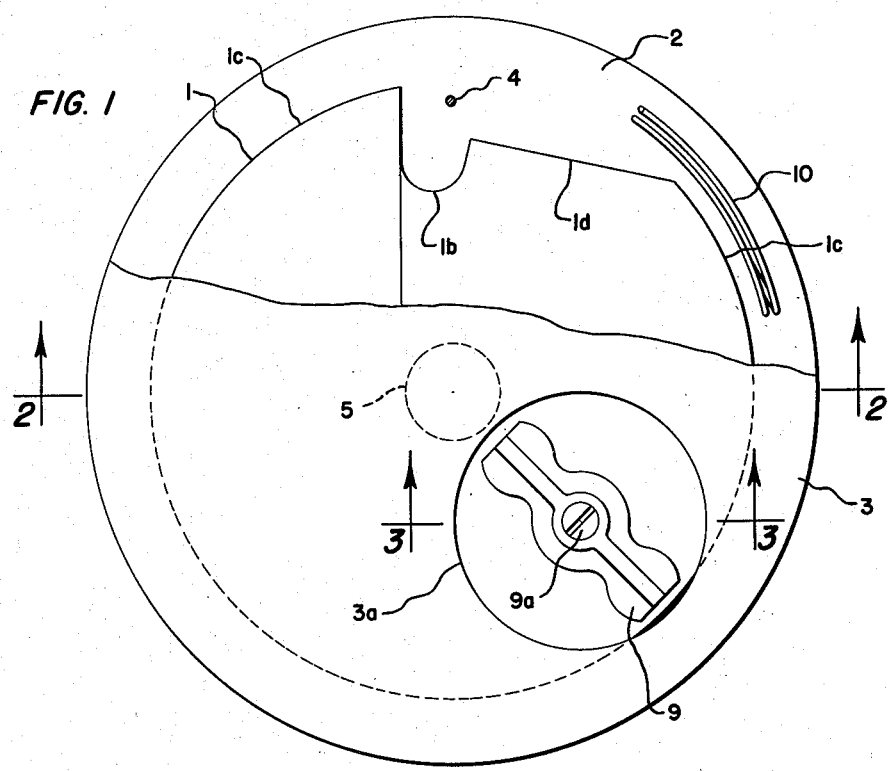
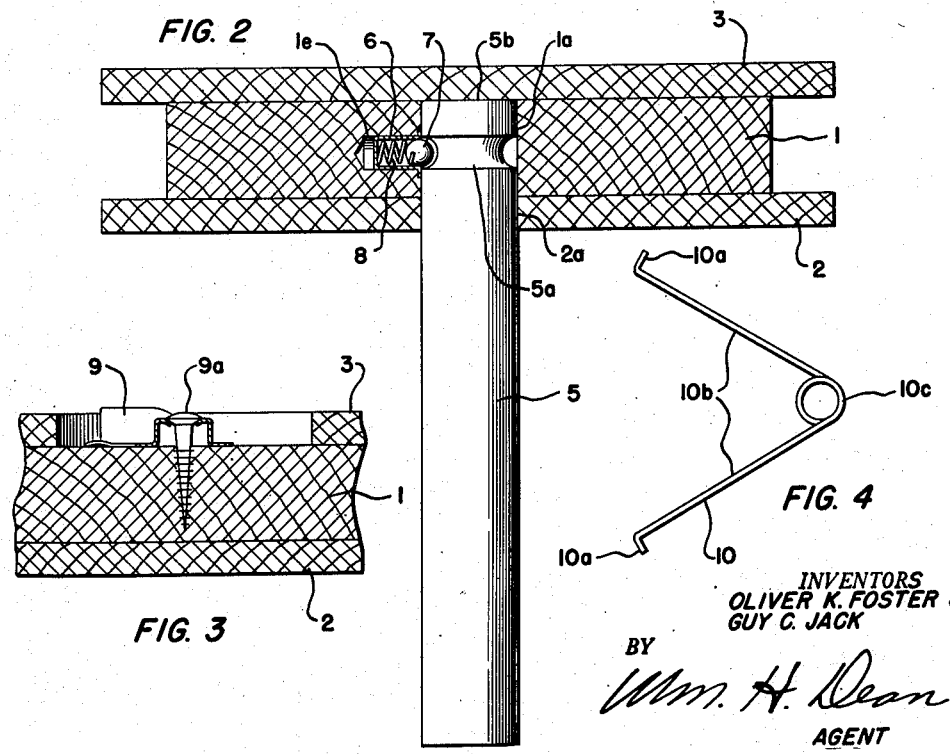
INVENTORS
OLIVER K. FOSTER &
GUY C. JACK
BY
Wm. H. Dean
AGENT Patented Mar. 24, 1953

2,632,610

UNITED STATES PATENT OFFICE 2,632,610

CONTROL LINE REEL

Oliver K. Foster and Guy C. Jack, San Diego, Calif.; said Jack assignor to Genevieve S. Foster Application April 7, 1948, Serial No. 19,516

2 Claims. (Cl. 242—117)

Our invention relates to a control line reel, more particularly for use in supporting model airplane control lines, or other similar line, and the objects of our invention are:

First, to provide a reel of this class which employs a drum in which the line anchor pin thereof is disposed inwardly of the periphery of the drum, permitting the line to be wound over the anchor pin without interrupting the arcuate contour of the line passing around the drum, so that irregular winding and unwinding is avoided;

Second, to provide a control line reel of this class having a recessed anchor pin around which the drum is sufficiently recessed to permit attachment of the line whereby the connection knot tied to the anchor pin may be disposed within the recess below the periphery of the drum so that the knot does not entangle the convolutions of the line passing around the drum on the reel;

Third, to provide a control line reel of this class which incorporates novel handle structure which may be readily detached or firmly attached to the reel without undue effort;

Fourth, to provide a control line reel of this class in which the handle thereof is provided with an annular groove around the inner end thereof, engageable by a spring loaded detent internally of the reel, providing a free-running arrangement of the reel on the handle which simultaneously maintains the reel located positively longitudinally of the axis of the handle;

Fifth, to provide a control line reel of this class having a novel recessed winding handle;

Sixth, to provide a control line reel of this class having a novel line retainer spring for holding the line in wound position on the reel; and Seventh, to provide a control line reel of this class which is very simple and economical of construction, efficient in operation, and which will not readily deteriorate or get out of order.

With these and other objects in view, as will appear hereinafter, our invention consists of certain novel features, of construction, combination and arrangement of parts and portions, as will be hereinafter described in detail and particularly set forth in the appended claims, reference being had to the accompanying drawings and to the characters of reference thereon forming a part of this application, in which:

Fig. 1 is a side elevational view of our control line reel showing the winding side thereof and showing a portion of one end plate broken away to amplify the illustration. Fig. 2 is a longitudinal sectional view taken from the line 2—2 of Fig. 1. Fig. 3 is a fragmentary sectional view taken from the line 3—3 of Fig. 1, showing parts in elevation to facilitate the illustration, and Fig. 4 is a side elevational view of the retainer spring of our control line reel.

Similar characters of reference refer to similar parts and portions throughout the several views of the drawing.

The drum 1, end plates 2 and 3, anchor pin 4, supporting handle 5, detent casing 6, detent ball 7, detent spring 8, winding handle 9 and retainer spring 10 constitute the parts and portions of our control line reel.

The drum 1 is a disc-shaped member having a central bore 1a therein and having a radially disposed bore 1e communicating therewith, in which the detent casing 6 is fitted. This detent casing 6 is cup-shaped and retains the spring 8 which engages the ball 7, adapted to engage the annular recess 5a in the supporting handle 5. It will be noted that the end plate 2 is provided with a central bore 2a therein, aligned with the central bore 1a in the drum 1, and that the end plate 3 is enclosed at its center portion forming an abutment for the inner end 5b of the supporting handle 5. The supporting handle 5 is circular in cross-section, as indicated by dash lines in Fig. 1 of the drawing, and the drum 1 and side plate 2 are freely rotatable around this supporting handle 5, all as shown best in Fig. 2 of the drawing. The end plate 3 is provided with an eccentric opening 3a therein, in which the winding handle 9 is rotatably mounted and supported on a screw 9a secured in the drum 1 as shown best in cross-section in Fig. 3 of the drawing. Thus the end plates 2 and 3 are placed on opposite ends of the drum 1 in fixed relationship therewith, and this drum 1, as shown in Fig. 1 of the drawings, is provided with a peripheral notch 1b therein, adjacent to which the pin 4 is positioned inwardly of the periphery 1c of the drum 1 and the opposite ends of the pin 4 are supported and secured in the end plates 2 and 3. Communicating with the recess 1b is an angular cordal relief portion 1d which extends to the periphery 1c of the drum 1, so that line may be anchored to the anchor pin 4 and extend over the cordal relief portion 1d to the periphery 1c and then extend around the drum 1 in conventional convolutions. The retainer spring 10 is a one-piece structure, having angular ends 10a opposed to each other and extending outwardly. These ends 10a are fixed to diverging legs 10b integrally connected together by spiral coils 10c of resilient character tending to force the legs 10b apart and engage the ends 10a thereof with the inner sides of the end plates 2 and 3, as shown in Fig. 1 of the drawing, the loop portion 10c being adapted to hold the end of the line wound around the drum 1 and anchored at its opposite end on the anchor pin 4. In this manner the line is maintained in neat connected relationship with the control line reel when not in use.

The operation of our control line reel is substantially as follows:

When the line at its one end is anchored to the pin 4, it may be wound on the drum 1 intermediate the end plates 2 and 3 by holding the handle 5 in one hand and engaging the winding handle 9 in the other hand and rotating the same about the axis of the handle 5 around which the end plates 2 and 3, in connection with the drum 1, may be freely moved. It will be noted that the detent casing 6, ball 7 and spring 8 pass around the annular grooved portion 5a of the handle 5 when the control line reel is rotated, as hereinbefore described. To remove the handle 5 it is simply retracted axially of the bore 1a of the drum 1 and the bore 2a of the end plate 2, which causes compression of the spring 8 and forces the ball 7 inwardly of the casing 6.

Though we have shown and described a particular construction, combination and arrangement of parts and portions, we do not wish to be limited to this particular construction, combination and arrangement, but wish to include in the scope of our invention the construction, combination and arrangement substantially as set forth in the appended claims.

Having thus described our invention, what we claim as new and desire to secure by Letters Patent is:

1. A model airplane control line reel of the class described, the combination of a disc-shaped drum, a recessed portion in the periphery of said drum, an anchor pin in said recessed portion inwardly of the periphery of the drum, end plates at opposite ends of said drum for supporting opposite ends of said anchor pin, a cordal relief portion communicating with said recessed portion and extending to the periphery of said drum, one of said end plates having an opening centrally therethrough, said drum having a central bore therein, detent means in connection with said drum, communicating with said bore, and a handle having an annular groove in the outer side thereof engageable with said detent means and extendable into said bore of said drum and through said opening in said end plate, the end plate on the opposite side of said drum enclosed at the middle portion, forming an abutment for the end of said handle.

2. A model airplane control line reel of the class described, the combination of a disc-shaped drum, a recessed portion in the periphery of said drum, an anchor pin in said recessed portion inwardly of the periphery of the drum, end plates at opposite ends of said drum for supporting opposite ends of said anchor pin, a cordal relief portion communicating with said recessed portion and extending to the periphery of said drum, one of said end plates having an opening centrally therethrough, said drum having a central bore therein, detent means in connection with said drum, communicating with said bore, a handle having an annular groove in the outer side thereof engageable with said detent means and extendable into said bore of said drum and through said opening in said end plate, the end plate on the opposite side of said drum enclosed at the middle portion, forming an abutment for the end of said handle, and a winding handle at the opposite side of said reel from the projection of said handle, said winding handle connected with said drum, the end plate adjacent said winding handle having an opening eccentrically thereof in which said winding handle operates, whereby said winding handle is substantially flush at its outer side with the outer side of said end plate having the eccentric opening therein.

OLIVER K. FOSTER.
GUY C. JACK.

REFERENCES CITED

The following references are of record in the file of this patent:

UNITED STATES PATENTS

| Number | Name | Date |
| --- | --- | --- |
| 285,630 | Kasschau | Sept. 25, 1883 |
| 634,519 | Burkman | Oct. 10, 1899 |
| 808,114 | Rowley et al. | Dec. 26, 1905 |
| 866,855 | Gay | Sept. 24, 1907 |
| 1,761,837 | McCarthy | June 3, 1930 |
| 1,829,482 | Hayden | Oct. 27, 1931 |
| 1,933,163 | Coplen | Oct. 31, 1933 |
| 2,220,610 | Miller | Nov. 5, 1940 |
| 2,329,943 | Robins | Sept. 21, 1943 |
| 2,394,523 | Pancoe | Feb. 5, 1946 |
| 2,397,087 | Camras | Mar. 26, 1946 |
| 2,421,256 | Galford | May 27, 1947 |